United States Patent [19]
Holland

[11] Patent Number: 5,195,311
[45] Date of Patent: Mar. 23, 1993

[54] COLLAPSIBLE DISCHARGE DEFLECTING CHUTE FOR ROTARY MOWERS

[76] Inventor: Charles R. Holland, 4309 Stoltz Ct., Louisville, Ky. 40215

[21] Appl. No.: 754,744

[22] Filed: Sep. 4, 1991

[51] Int. Cl.[5] .................. A01D 34/67; A01D 34/82; A01D 75/20
[52] U.S. Cl. .................. 56/320.2; 56/202; 56/DIG. 20
[58] Field of Search ............ 56/320.2, 320.1, 202, 56/17.4, 17.5, 255, 295, 16.6, DIG. 20

[56] References Cited

U.S. PATENT DOCUMENTS

| | | | |
|---|---|---|---|
| 2,708,334 | 5/1955 | Coners | 56/320.2 |
| 3,099,123 | 7/1963 | Price | 56/202 |
| 3,423,918 | 1/1969 | Siwek | 56/202 |
| 3,648,445 | 3/1972 | Efflant | 56/320.2 |
| 3,721,078 | 3/1973 | Haffner | 56/202 |
| 3,872,656 | 3/1975 | Dahl | 56/320.2 X |
| 4,008,559 | 2/1977 | Lessig, III et al. | 56/320.2 |
| 4,107,907 | 8/1978 | Rutherford | 56/320.2 |
| 4,258,539 | 3/1981 | Pearce et al. | 56/320.2 |
| 4,282,704 | 8/1981 | Stevens | 56/17.4 X |
| 5,003,757 | 4/1991 | Hill | 56/320.1 X |

Primary Examiner—Stephen J. Novosad
Attorney, Agent, or Firm—Middleton & Reutlinger

[57] ABSTRACT

A collapsible discharge deflecting chute (often called in the industry today a "chute deflector") for rotary mowers hingeably and collapsibly attached to the mower housing comprising a front vertical panel, a front hinge plate hingeably connected to the front vertical panel for removably securing the front vertical panel to the mower housing, an outer top panel hingeably connected to the front vertical panel, an inner top panel hingeably connected to the outer top panel, a top hinge plate hingeably connected to the inner top panel for removably securing the front vertical panel to the mower housing, and a rear flap panel hingeably connected to the inner top panel. The collapsible discharge deflecting chute has "memory" in that it is biased in an open position by gravitational forces (on metal version, by "molded" memory if plastic) during normal operating conditions permitting the discharge of grass clippings from the mower housing. The collapsible discharge deflecting chute collapses upon striking an object, blocking the mower housing outlet discharge deflecting chute; however, the collapsible discharge deflecting chute automatically springs into the open position upon removal of the object.

19 Claims, 5 Drawing Sheets

COLLAPSIBLE DISCHARGE DEFLECTING CHUTE FOR ROTARY MOWERS

BACKGROUND OF THE INVENTION

The reason all side discharge mowers (the most common type in the United States) are equipped with a "discharge deflecting chute" (as it stands in the art today) is three-fold; 1) to keep all flying debris (from the blade of a rotary mower) at a very low; and therefore safer, altitude, this allows the (manufacturer of) mower/equipment to pass a required "Flying Objects Test" (defined in ANSI Standard 71.4), 2) while meeting all the criteria of the Flying Objects Test, the discharge deflecting chute should still allow the widest possible broadcast dispersal of grass clippings, and 3) the discharge deflecting chute must disallow entry of a person's feet into the mower housing which may result in contact with the moving cutting blade (ANSI 71.4).

After meeting all of the above criteria, most of them (on commercial units only) easily fold up, hinged on a horizontal axis allowing a grass catcher to be attached. Some commercial units have a strong torsion spring that will automatically position the chute in the down mode when a grass catcher is not attached. Side discharge mowers allow clippings to be broadcast or bagged; however, current discharge deflecting chute will not permit close trimming on chute side.

For instance, U.S. Pat. No. 4,258,539 describes a type of grass discharge chute which allows one mower to be altered to either of two configurations. The first, with a flat arched coverplate suction causes the unit to operate as a side-discharging rotary unit, and the second, by removing the coverplate and attaching a rear-bagging type discharge chute in its place and then further attaching a bag-type catcher may be operated as a rear-bagging unit.

U.S. Pat. No. 3,648,445 relates to an extension for a rotary mower safety chute outlet which will not allow any object to escape horizontally from the plane of the mower's rotating cutting blade; therefore, clippings and other debris must first ascend vertically prior to their downward angled exit from the mower housing.

U.S. Pat. No. 3,721,078 teaches the use of a pedal controlled hinged chute for lawn mowers. This device is simply a "normal" discharge chute with the addition of a foot pedal to manually raise the chute when attaching a grass catcher.

U.S. Pat. No. 4,008,559 teaches the use of a locking mechanism to hold the safety discharge chute into position. The hinge/bracket adaptation holds the chute in its downward position so that debris does not escape the mower housing to push the deflector chute up. The hinge/bracket can also be used to manually lock the chute in a vertical position to provide for attachment of a grass catcher.

U.S. Pat. No. 4,107,907 is not a discharge deflecting chute at all, but an articulated foot guard.

All of these safety discharge deflecting chutes require manual positioning. None of them utilizes the self-articulating feature as does the present invention to collapse and fold upon contact with any obstruction in its path, and then automatically unfold to an open position without manual assistance. Additionally, further differentiating the instant claimed invention from the prior art references is the fact that its primary and most significant pivotal axis is the vertical axis at the front corner where the discharge deflecting chute attaches to the mower housing. This novel design is necessary to provide self-displacement of the discharge deflecting chute upon coming into contact with oncoming obstructions. No motion is required of the operator to remove or fold the discharge deflecting chute. The forward motion of the cutting deck provides the necessary force to collapse the discharge deflecting chute as claimed in the instant invention.

Upon striking an object, the front vertical panel of the discharge deflecting chute, of the present invention, collapses to completely cover the mower housing discharge outlet to avoid compromising the safety of the operator/bystanders. Operator safety is also provided when the discharge deflecting chute is in the normal, down, discharge mode/position in that the rear flap remains in a vertical/downward position to function in a similar manner to "rigid" chutes like those seen currently in the market. This feature enables the present claimed invention to successfully pass the "Flying Objects Tests" and be deemed safe for consumer/operator safety.

Federal regulations require that all mowers are to have a discharge deflecting chute attached while in use; however, typical rigid discharge deflecting chutes are a nuisance, therefore, many consumers and landscape contractors remove to allow close, two-side, trimming and transporting in narrow truckbeds and trailers. The present invention provides a novel discharge deflecting chute which is inexpensive to manufacture, easy to use, adaptable to all models of rotary side discharge mowers, meets existing federal safety regulations, and provides a means for protecting the user without the user having to manually manipulate the discharge deflecting chute to mow around objects.

SUMMARY

Side discharge mowers must be equipped with some type of discharge deflecting chute. The discharge deflecting chute must pass a "thrown objects" test, be designed to prevent entry of a "foot probe" into the moving cutting blade, and still disperse grass clippings. Currently, side discharge mowers are designed to allow clippings to be broadcast or bagged; however, the current discharge deflecting chutes extend out past the side of the mower. This chute extension hinders trimming operations and renders one side of the mower unusable for close trimming around obstacles.

The present invention solves this trimming problem while providing the safety features necessary to protect the user and bystanders. The present invention is a collapsible discharge deflecting chute for rotary mowers hingeably attached to the mower housing comprising a front vertical panel, a front hinge plate hingeably connected to the front vertical panel for removably securing the front vertical panel to the mower housing, an outer top panel hingeably connected to the front vertical panel, an inner top panel hingeably connected to the outer top panel, a top hinge plate hingeably connected to the inner top panel for removably securing the front vertical panel to the mower housing, and a rear flap panel hingeably connected to the inner top panel. The collapsible discharge deflecting chute has memory and is biased in an open position by gravitational forces (on metal version, by "molded" memory if plastic) during normal operating conditions permitting the discharge of grass clippings from the mower housing. The collapsible discharge deflecting chute collapses upon striking an object, blocking the mower housing outlet discharge deflecting chute; however, the collapsible discharge deflecting chute has memory and automatically springs into the open position upon removal of the object.

The present invention is designed to fold up when it comes in contact with an object such as a tree or building. The collapsible discharge deflecting chute folds flat against the side of the mower to facilitate trimming and simultaneously closes off the discharge deflecting chute to prevent injury to bystanders from flying debris. Once the object is cleared, the discharge deflecting chute opens to disperse the grass clippings.

BRIEF DESCRIPTION OF THE DRAWINGS

A better understanding of the present invention will be had upon reference to the following description with the accompanying drawings in which like numerals refer to like parts throughout the several views and wherein.

DETAILED DESCRIPTION OF THE PREFERRED EMBODIMENT

Figure 1:
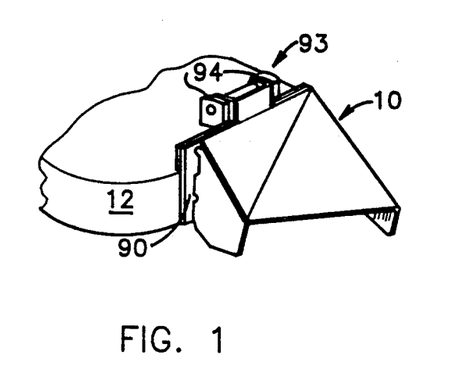
FIG. 1 is a perspective view of the present invention showing the collapsible discharge deflecting chute in the open position.
Figure 1A:
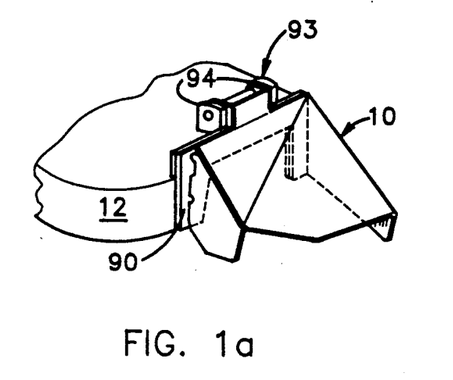
FIG. 1a is a perspective view of the present invention showing the collapsible discharge deflecting chute of FIG. 1 in the open position and the mounting bracket in phantom lines.
Figure 2:
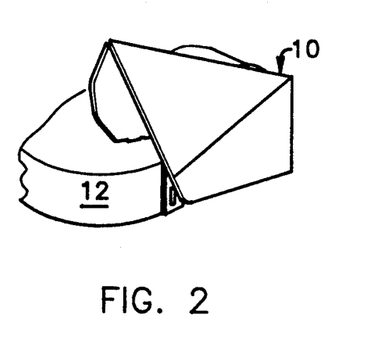
FIG. 2 is a perspective view of the present invention showing the collapsible discharge deflecting chute in the closed position.
Figure 2A:
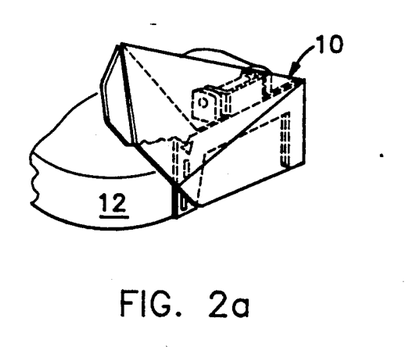
FIG. 2a is a perspective view of the present invention showing the collapsible discharge deflecting chute of FIG. 2 in the closed position and the mounting bracket in phantom lines.

The present invention is a collapsible discharge deflecting chute 10 for rotary mowers which is hingeably attached to the mower housing 12. FIG. 1 and 1a show the collapsible discharge deflecting chute 10 in the open position. FIGS. 2 and 2a show the collapsible discharge deflecting chute 10 attached to the mower housing 12 in the closed position.

Figure 3:
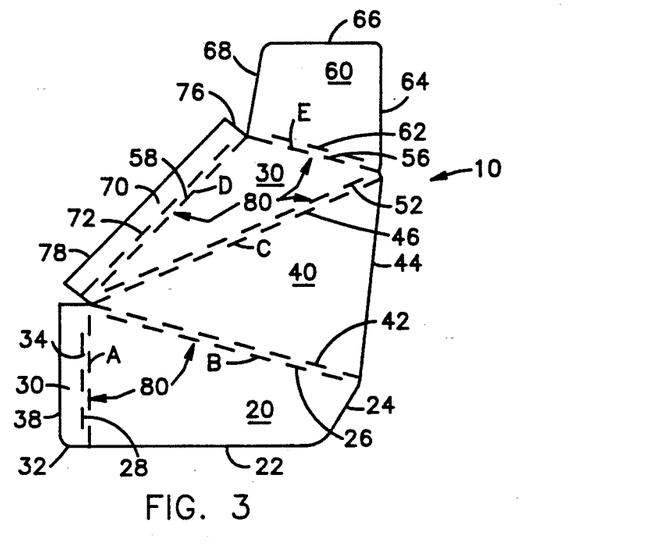
FIG. 3 is an expanded view of the discharge deflecting chute in FIG. 1 showing the separate panels hingeably connected together and including the top and side hinge plates of the present invention.

As best illustrated in FIG. 3, the preferred embodiment of the collapsible discharge deflecting chute 10 has a front vertical panel 20, a front hinge plate 30, an outer top panel 40, an inner top panel 50, a rear flap panel 60, and a top hinge plate 70. The front vertical panel 20 has a bottom edge 22, an outside edge 24, a top edge 26, and a front edge 28. The front hinge plate 30 has a bottom edge 32, a front edge 34, and a rear edge 38. The outer top panel 40 has a front edge 42, an outside edge 44, and a rear edge 46. The inner top panel 50 has a front edge 52, a rear edge 56, and an inside edge 58. The rear flap panel 60 has a top edge 62, an outside edge 64, a bottom edge 66, and an inside edge 68. The top hinge plate 70 has a top edge 72, a rear edge 76, and a bottom edge 78.

The panels and plates are hingeably connected together to form a collapsible discharge deflecting chute 10 for rotary mowers which can be hingeably attached to the mower housing 12. The rear edge 38 of the front hinge plate 30 is removably secured and hingeably attached to the vertical position of the discharge outlet of the mower housing 12. The front edge 34 of the front hinge plate 30 is hingeably connected to the front edge 28 of the front vertical panel 20. The top edge 26 of the front vertical panel 20 is hingeably connected to the outer top panel 40. The rear edge 46 of the outer top panel 40 is hingeably connected to the front edge 52 of the inner top panel 50. The rear edge 56 of the inner top panel 50 is hingeably connected to the rear flap panel 60. The inside edge 58 of the inner top panel 50 is connected to the top edge 72 of the top inner plate 70. The top hinge plate 70 is removably secured and hingeably attached to the top, horizontal portion of the discharge outlet of the mower housing 12.

The panels 20, 30, 40, 50, 60, and 70 are connected by hinge means. The collapsible discharge deflecting chute 10 can be molded in one piece from polyethylene, or a similar plastic (the inventor's material of choice), in a very inexpensive and efficient manner. By designing the mold so that the thickness of the plastic between the panel portion is thinner than the area between the panel portions, seams 80 can be formed between the individual panels which perform as "living hinges". As shown in FIG. 3, the seam between the front vertical panel 20 and the front hinge plate 30 is hinge "A"; the seam between the front vertical panel 20 and the outer top panel 40 is hinge "B"; the seam between the outer top panel 40 and the inner top panel 50 is hinge "C"; the seam between the inner top panel 50 and the rear flap panel 60 is hinge "D"; and the seam between the inner top panel 50 and the top hinge plate 70 is hinge "E".

An advantage to using polyethylene, or a similar plastic, to form the collapsible discharge deflecting chute 10 is that the molds can be designed to control the thickness of the seams 80 on the inside surface of the collapsible discharge deflecting chute 10 in contact with the grass clippings, so that the panels are self-biased in an open position by a "molded-in" memory during normal operating conditions permitting the discharge of grass clippings from the mower housing 12. The collapsible discharge deflecting chute 10, as described and shown in FIG. 3, collapses upon striking an object such as a tree, blocking the outlet discharge of the mower housing 12 as shown in FIGS. 1 and 1a. The "living hinges" feature provides the collapsible discharge deflecting chute 10 with "memory". Therefore, the collapsible discharge deflecting chute 10 automatically springs open upon removal of the object blocking the chute 10.

The front vertical panel 20 is hingeably attached to the vertical front corner portion of the mower housing outlet and the inner top panel 50 is hingeably attached to the horizontal portion of the mower housing 12. Hingeably attaching the front vertical panel 20 to the front corner portion of the mower housing 12 is necessary to effect the self-displacement or "collapsible" feature of the present invention. The front vertical panel 20 must pivot freely on the hinge "A" in order to fully obstruct the mower's discharge opening, when collapsed, to provide maximum protection from thrown objects.

It is contemplated that the collapsible discharge deflecting chute 10, as described in the preferred embodiment and shown in FIG. 3, could also be manufactured utilizing the front edge 28 of the front vertical panel 20 and/or the inside edge 58 of the inner top panel 50 to removably secure and hingeably attach the collapsible discharge deflecting chute 10 directly to the mower housing 12. Thus, either front vertical panel 20, inner top panel 50, top hinge plate 70, or the front hinge plate 30 can be used in combination to removably secure and hingeably attach the collapsible discharge deflecting chute 10 to the mower housing 12.

The panels 20, 30, 40, 50, 60, and 70 can be manufactured in individual panels made of either plastic, metal, or any other material. Panels designed as shown in the drawings, and described in the specifications, are self-biasing. Panels manufactured from heavy material such as sheet metal tend to hold the collapsible discharge deflecting chute 10 open by force of gravity due to the weight of the panels, whereas panels made from lighter material such as plastic are formed having "memory" to hold the panels open. The configuration of the panels is also a factor which determines how the panels are held in the open or closed position.

Figure 4:
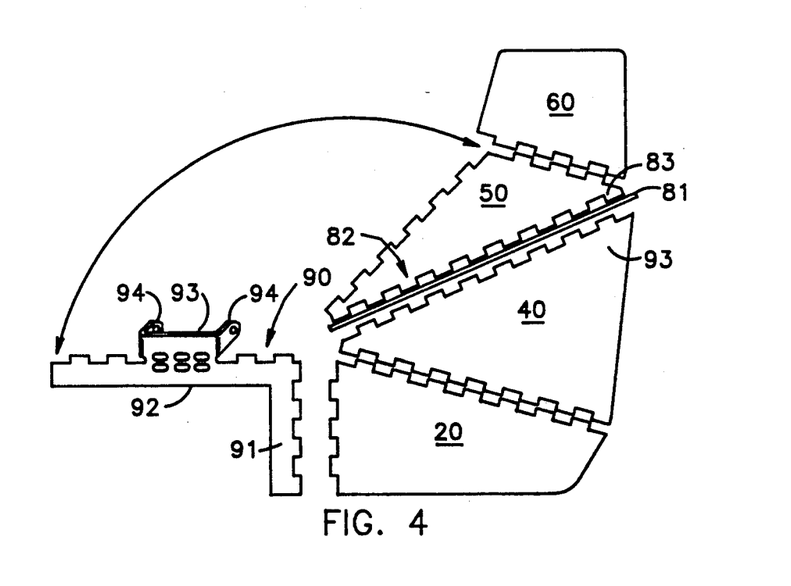
FIG. 4 is an exploded view of the discharge deflecting chute showing the separate panels hingeably connected together utilizing a pivoting mounting bracket of the present invention.
Figure 5:
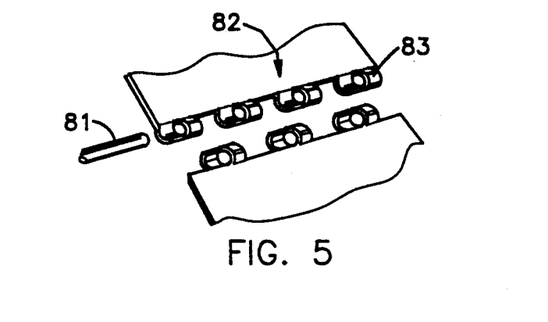
FIG. 5 is a perspective view of the present invention showing one type of integral hinge means used to connect the panels of the discharge deflecting chute together.

The panels are hingeably connected together by a simple hinge means 82 as shown in FIGS. 4 and 5, or by any type of inexpensive hinges 82 which are readily available. The hinges 82 may be integrally incorporated within the panels as shown in FIG. 4 where a rod 81 is inserted to connect the tabs 83 formed in the panels, or a hinge 82 assembly may be attached to the panels as shown in FIG. 3. The hinge assembly 82 should be of a continuous type such as a double-leaf "piano" hinge. This prevents the escape of clippings through openings between the individual segments of the hinge 82 and presents a smooth and attractive appearance for the rearward edge profile of the closed collapsible discharge deflecting chute 10. The hinge 82 shown in FIG. 5 is a single-stamped integral hinge designed to by used primarily on the metal version which can be formed by being hit "one time" with a die set instead of rolled.

Figure 16:
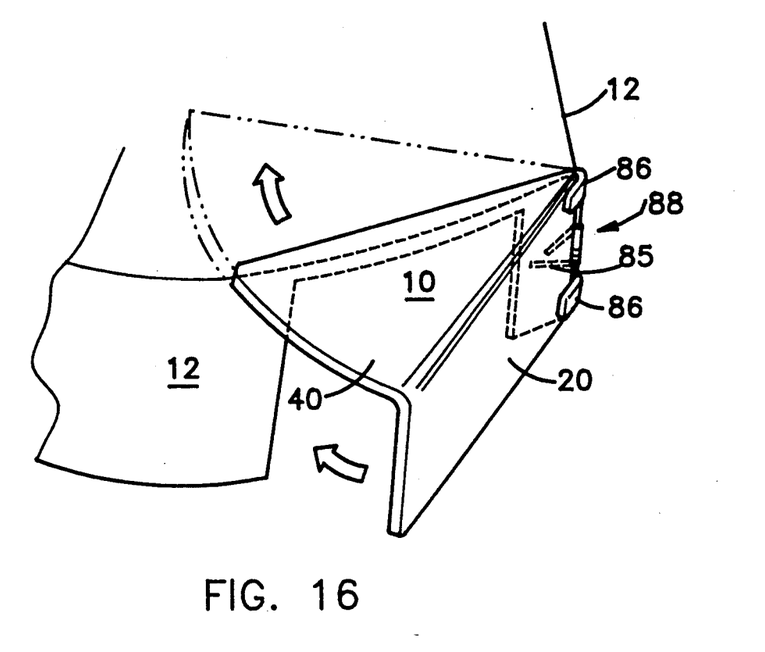
FIG. 16 is a perspective view of an embodiment of the present invention comprising a two panel collapsible discharge deflecting chute wherein the front vertical panel blocks the mower housing discharge and the top panel slides over the top of the mower housing, and a torsion spring biasing means is used in combination with stop means to hold the chute in the desired position.

A simple biasing means such as a torsion spring 88 may also be employed and attached between the panels (incorporated on either hinge "A" or "C") and be held in place by running the hinge pin/rod 84 through the coils of the spring while at the same time trapping the two straight-ends (or legs) of the spring inside the chute 10 as illustrated in FIG. 16. The spring would bias the panels open wherein a stop means 86 could be used to limit the extension of the panels in the open position. Other types of spring means may also be configured to be used in addition to or substituted for the torsion spring to provide additional biasing force to hold the collapsible discharge deflecting chute 10 in the open position, but at less than 180 degrees so that the chute 10 would still fold and close in the proper manner. The spring 88 may be useful on the metal version of the collapsible dishcarge deflecting chute 10 to provide additional biasing force in case of contamination of the hinge with dirt or debris. The spring 88 could even be used on the plastic version by adding a short rod with flattened ends riveted on each side of the spring 88.

The collapsible discharge deflecting chute 10 is removably secured and hingeably attached to mower housing 12 so that front vertical panel 20 and the rear flap panel 60 are positioned in parallel manner in the same vertical plane with respect to one another while in use int he down/discharge mode. While in the down-/discharge position, the rear flap panel 60 and hinge "D" are positioned in a vertical manner perpendicular to the mower deck to provide maximum protection to the operator in a similar manner as the "rigid " chutes currently used on rotary mowers. The hinge "D" is in direct alignment with the discharge outlet of the mower housing 12.

The angle between the rear vertical portion of the mower housing 12, adjacent the discharge opening, contacts the inside edge 68 (the corner of the rear flap panel 60) of the collapsible dishcarge deflecting chute 10 at an angle less than 90 degrees to insure that an object thrown rearward by the rotating blade tip will not be able to lift the rear flap panel 60 upon impact.

The outer top panel 40 and the inner to panel 50 are extended so as to lie substantially flat int he same plane parallel to one another, and largely perpendicular to the front vertical panel 20 and the rear flap panel 60 while the collapsible discharge deflecting chute 10 is in the down/discharge position. However, it is important for the collapsible discharge deflecting chute 10 to collapse properly and not in an inverted manner. Therefore, the outer top panel 40 and the inner top panel 50 do not lie in an absolute flat plane, for the panels should meet each other in such a manner as to form an angle greater than 180 degrees on the top or outside of the panels and an angle of less than 180 degrees on the underside in order to insure that, upon closing, hinge "C" will always move upward vertically rather than downward for the collapsible discharge deflecting chute 10 to close properly when striking an object to block the discharge deflecting chute.

Upon collapse of the discharge deflecting chute 10, the outer top panel 40 extends rearward beyond the point where the inner, upper corner of the rear flap panel 60 (formed by the inside edge 68 and top edge 62) meets the inner, rearward corner of the inner top panel 50 (formed by the inside edge 58 and rear edge 56). The rear flap panel 60 is held in a closed position by the connecting panels avoiding contact with any oncoming structures which has caused the discharge deflecting chute 10 to collapse.

A mounting plate 90 may be used to removably secure and hingeably attach the collapsible discharge deflecting chute 10 to the mower housing 12. The mounting plate 90, as shown in FIG. 4, is fabricated from sheet steel and has a vertical member 91 which is hingeably attached to the front edge 28 of the front vertical panel 20, and a horizontal member 92 which is hingeably attached to the front edge 28 of the inner top panel 50. A hinge 93, having ears 94, extends perpendicular to the face of the vertical and horizontal members 91 and 92 respectively. The mounting plate 90 abuts the discharge outlet of the mower housing 12 to provide additional support for the collapsible discharge deflecting chute 10. The hinge 93 can be removably secured to the mower housing 12 as shown in FIGS. 1 and 1a, so that the collapsible discharge deflecting chute 10 can be pivoted up to rest on top of the mower housing 12 to facilitate attachment of a grass catcher to the outlet discharge portion of the mower housing 12. It is also contemplated that a spring may be employed between the mower housing 12 and the mounting plate 90 to provide additional bias against the collapsible discharge deflecting chute 10 in the downward in-use position.

Figure 6:
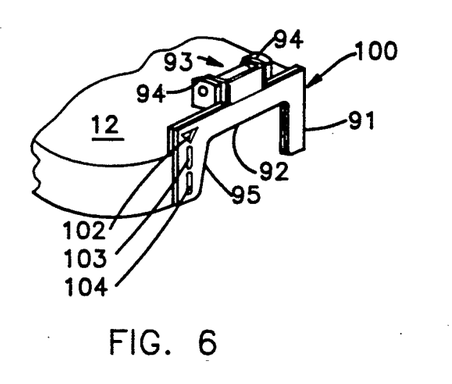
FIG. 6 is a perspective view of the present invention showing the mounting bracket hinge assembly for removably securing and hingeably attaching the collapsible discharge deflecting chute to the mower housing and having slots in the rear vertical position to accommodate tabs extending from the rear flap panel of the collapsible discharge deflecting chute.
Figure 7:
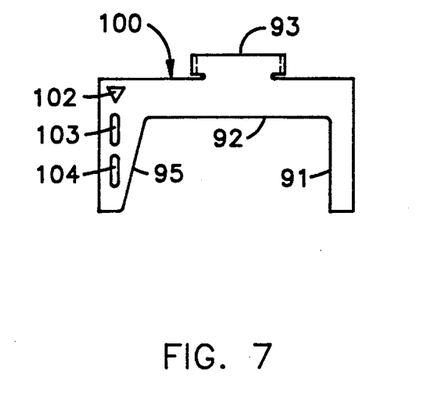
FIG. 7 is a front view of the mounting bracket of FIG. 6.
Figures 8, 9:
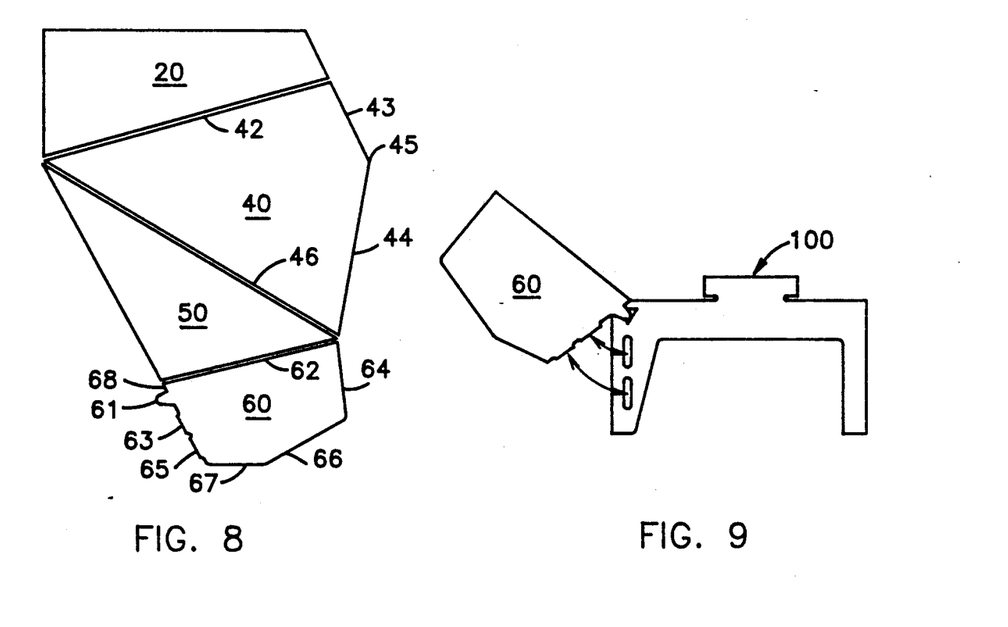
FIG. 8 is an expanded view of the collapsible discharge deflector chute of the present invention showing the rear flap panel to be modified to include profiled tabs, four edges on the rear flap panel, and four edges on the outer top panel.
FIG. 9 is a front view showing the position of the profiled tabs of the rear flap panel of FIG. 8 engaged within the slots of the mounting bracket of FIG. 7 when the collapsible discharge deflecting chute of the present invention is in the collapsed "up" position.
Figure 10:
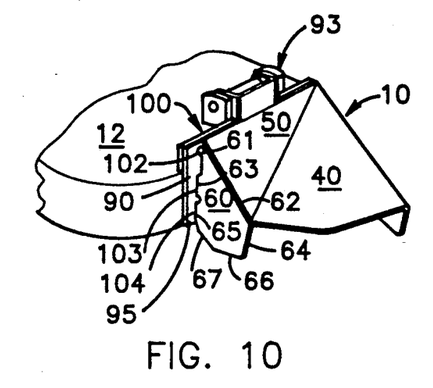
FIG. 10 is a perspective view of the collapsible discharge deflector chute in the "down" position showing the modified rear flap panel of FIG. 8 having profiled tabs extending from the inside edge which cooperate with the slots in the mounting bracket shown in FIGS. 6 and 7 to provide positive rigid alignment of the rear flap with respect to the mounting bracket during the downward in-use mode to prevent insertion of the operator's foot into blade area of the mower housing.

The mounting plate 100, shown in FIGS. 6 and 7, is similar to the mounting plate 90, shown in FIG. 4; however, the mounting plate 100 incorporates a second vertical member 95 in addition to the first vertical member 91 attached to the distal ends of the horizontal member 92. The second vertical member 95 has slots 102, 103, and 104 cut through the face of the sheet steel to cooperate with tabs 61, 63, and 65 projecting from the inside edge 68 of the rear flap panel 60 as shown in FIG. 8. FIG. 9 illustrates how tabs 61, 63, and 65 are positioned to engage slots 102, 103, and 104 when the collapsible discharge deflecting chute 10 is collapsed in the "up" position. FIG. 10 illustrates how tabs 61, 63, and 65 are positioned to engage slots 102, 103, and 104 when the collapsible discharge deflecting chute 10 is in the "open" down position. When the collapsible discharge deflecting chute 10 is positioned in the down "in-use" position, the top most tab 61 extends into the triangular shaped slot 102, tab 63 extends into slot 103, and tab 65 extends into slot 104. When the collapsible discharge deflecting chute 10 is in the "up" position and is in the motion of dropping into the "down" position, the triangular shaped slot 102 guides and aligns tabs 63 and 65 into their respective slots. The slots permit limited movement of the rear flap panel 60 with respect to the mounting plate 100 and facilitates the pivoting movement of the collapsible discharge deflecting chute 10 with respect to the mower housing 12. This tab and slot arrangement resists lateral displacement of the rear flap panel 60 and provides additional structural support and stability to the collapsible discharge deflecting chute 10 and mounting plate 100 assembly an prevents access to the cutting blade by the operator as a safety measure. Thus, when the discharge deflecting chute 10 is in the normal, down, discharge mode/position the rear flap 60 remains in a vertical/downward position to function in a similar manner to "rigid" chutes like those seen currently in the market.

The size and shape of the panels of the collapsible discharge deflector chute 10 vary based on the shape of the discharge opening and whether the collapsible discharge deflector chute 10 is adaptable to the left or right side of the mower housing 12. For instance, the panels could be crescent shaped on the sides adjacent the mower housing 12 to fit a mower having a circular shaped housing. It is contemplated that the present invention could utilize panels having various irregular shapes on their outer edges as well as the bottom edges as long as the panels were integrally hinged to cooperate in the manner as described in the in the preferred embodiment. Also, the panels may be sized and shaped in such a way as to allow higher trajectories for clippings.

As shown in FIG. 8, the outer top panel 40 has an outside front edge 43 in addition to the outside edge 44. The rear flap panel 60 has a rear bottom edge 67 in addition to the bottom edge 66. The panels are provided with these additional edges to accommodate various embodiments of the present invention.

Figure 11:
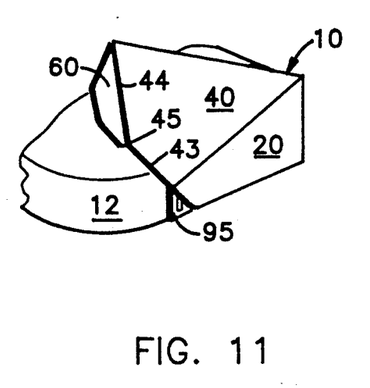
FIG. 11 is a perspective view of the present invention showing the collapsible discharge deflector chute of FIG. 10 in the collapsed "up" position.

FIGS. 10 and 11 show the primary design of the collapsible discharge deflector chute 10 in the open and closed position respectively. Rear flap panel 60 is shown having four edges (top edge 62, outside edge 64, bottom edge 66, and inside edge 68). The outer top panel 40 is shown having four edges (front edge 42, outside front edge 43, outside edge 44, and rear edge 46), wherein edge 43 and 44 meet to form a angled extension at point 45 to extend the chute 10 in the open position and cover a large portion of rear flap panel 60 in the closed position. The extended panels of this embodiment of the present invention provide maximum protection for the operator.

Figure 12:
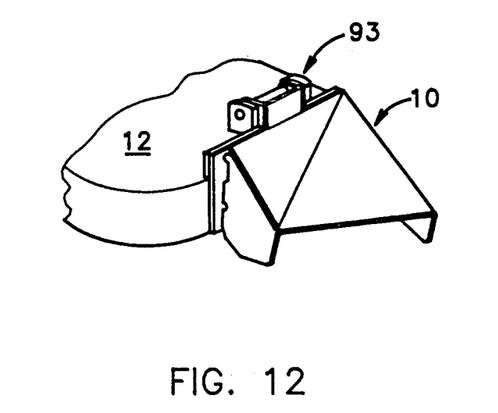
FIG. 12 is a perspective view of the present invention showing a secondary embodiment of the collapsible discharge deflector chute in the "down" position, wherein the outside edge of the outer top panel has a straight edge to permit a higher trajectory for the grass clippings.
Figure 13:
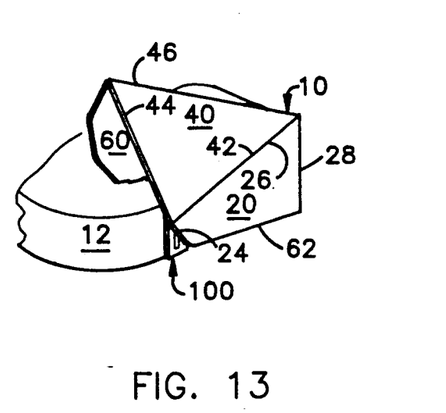
FIG. 13 is a perspective view of the present invention showing the collapsible discharge deflector chute of FIG. 12 in the collapsed "up" position.

FIGS. 12 and 13 show a secondary design for the collapsible discharge deflecting chute 10 wherein the rear flap panel 60 is shown having tabs (61, 63, and 65) projecting from rear edge 68. The outer top panel 40 is shown having three edges (front edge 42, outside edge 44, and rear edge 46). This design excludes point 45 and results in the outside edge 44 being a straight edge between the front edge 42 and rear edge 46. A larger portion of the rear flap panel 60 is exposed to prevent protection from flying debris from striking the operator, and the shape of panel 40 allows for a higher trajectory for the grass clippings to allow more even spreading of a larger quantity of clippings.

Figure 14:
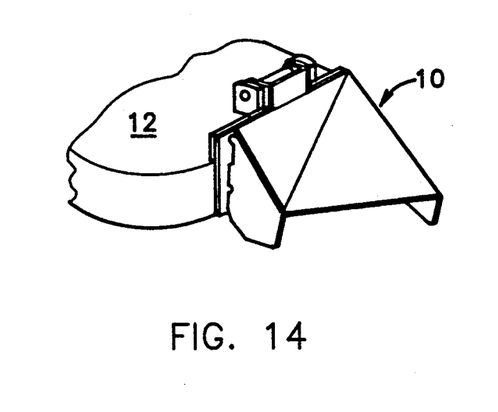
FIG. 14 is a perspective view of the present invention showing a third embodiment of the collapsible discharge deflector chute in the "down" position, wherein the outside edge of the outer top panel has a straight edge and the rear edge of the front vertical panel is less angled to provide the maximum trajectory for the grass clippings.
Figure 15:
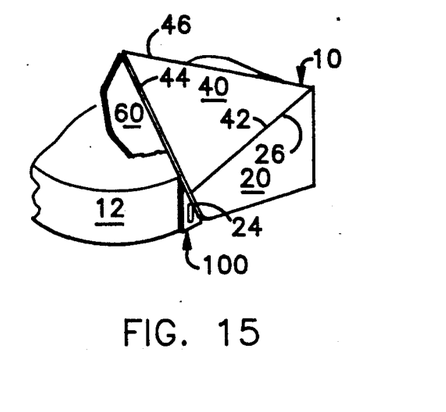
FIG. 15 is a perspective view of the present invention showing the collapsible discharge deflector chute of FIG. 14 in the collapsed "up" position.

FIGS. 14 and 15 show a third design for the collapsible discharge deflecting chute 10 wherein the rear flap panel 60 is shown having tabs (61, 63, and 65) projecting from rear edge 68. The outer top panel 40 is shown having three edges (front edge 42, outside edge 44, and rear edge 46). The edge 44 of outer top panel 40 and edge 24 of front vertical panel 20 have been reduced to allow for a higher trajectory for the grass clippings and maximize discharge dispersal of the clippings.

FIG. 16 shows an additional embodiment of the present invention, comprising only a front vertical panel 20 and an outer top panel 40 which slides over the mower housing 12 upon coming into contact with an object. A simple biasing means such as a torsion spring 88 has legs 85 which are attached to the inside of the front vertical panel 20 and the outside of the mower housing 12 or a mounting bracket 100. The spring may be held in place by running the hinge pin/rod 84 through the coils of the spring while at the same time trapping the two straight-ends (or legs) of the spring inside the chute 10 as illustrated in FIG. 16. The spring would bias the panels open and a stop means 86 could be used to limit the extension of the panels in the open position. Other types of spring means may also be configured to be used in addition to or substituted for the torsion spring to provide additional biasing force to hold the collapsible discharge deflecting chute 10 in the open position, but at less than 180 degrees so that the chute 10 would still fold and close in the proper manner.

Figure 17:
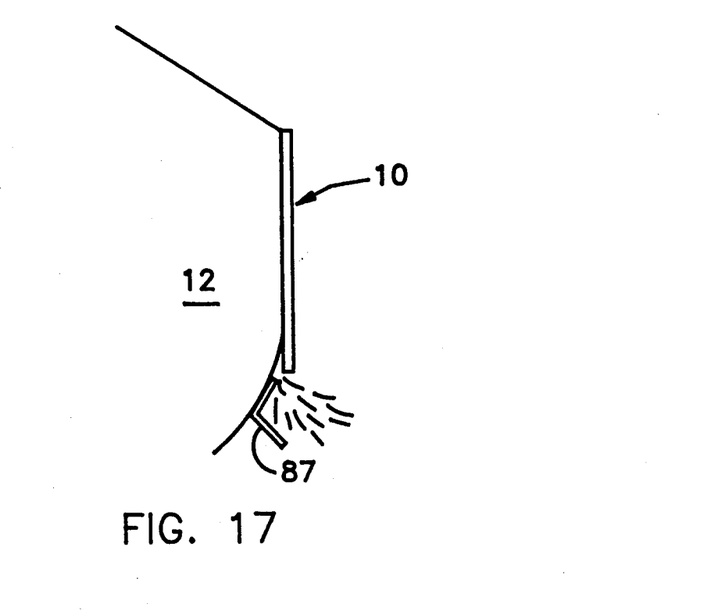
FIG. 17 shows a rear flap attached to the mower housing to deflect grass clippings which may be directed toward the operator when the collapsible discharge deflector chute is closed in the "up" position.

FIG. 17 shows an additional flap 87 which may be used in combination with the collapsible discharge deflecting chute 10 to keep blades of grass from coming back onto the operator when the collapsible discharge deflecting chute 10 is in the closed "up" position. As shown in FIG. 17 the flap 87 is attached to the mower housing 12; however, it is contemplated that the flap could also be attached to one or more of the panels of the collapsible discharge deflecting chute 10.

The novel collapsible feature provides a means for close two-sided trimming around obstacles using both sides of the rotary mower. Use of the present invention on rotary mowers not only enhances safety because it meets "ANSI" standards, but also because the operator need not reach down to manipulate or adjust the position of the collapsible discharge deflecting chute 10 as is required with typical conventional mower discharge chutes currently on the market. The collapsible discharge deflecting chute 10 also provides an improved and handy means of reducing the width of a mower utilizing the discharge deflecting chute, of the present invention, for loading the mower into narrow trucks or trailers for transporting to different locations.

The foregoing detailed description is given primarily for clearness of understanding and, no unnecessary limitations are to be understood therefrom, for modification will become obvious to those skilled in the art upon reading this disclosure and may be made upon departing from the spirit of the invention and scope of the appended claims.

I claim the following:

1. A collapsible discharge deflecting chute for rotary mowers hingeably attachable to the mower housing at the discharge outlet comprising:
   a front vertical panel;
   means for hingeably attaching said front vertical panel to said mower body;
   an outer top panel hingeably connected to said front vertical panel;
   an inner top panel hingeably connected to said outer top panel;
   means for hingeably attaching said inner top panel to said mower housing;
   and a rear flap panel hingeably connected to said inner top panel.

2. The collapsible discharge deflecting chute of claim 1, including a front hinge plate hingeably attached to said front vertical panel and removably secured to said mower housing and a top hinge plate hingeably attached to said inner top panel and removably secured to said mower housing.

3. The collapsible discharge deflecting chute of claim 1, including a mounting plate having a horizontal member and at least one vertical member, said mounting plate being pivotally mounted and removably secured to said mower housing and hingeably attached to said front vertical panel and said inner top panel of said collapsible discharge deflecting chute.

4. The collapsible discharge deflecting chute of claim 2, including a mounting plate comprising a horizontal member having a front vertical member and rear vertical member attached in a perpendicular manner to the distal ends of said horizontal member, said horizontal member being pivotally mounted and removably secured to said mower housing, said front vertical member being hingeably attached to said front hinge plate and said horizontal member being hingeably attached to said top hinge plate of said collapsible discharge deflecting chute.

5. The collapsible discharge deflecting chute of claim 1, wherein said rear flap panel includes tabs which protrude from the inside edge of said rear flap panel.

6. The collapsible discharge deflecting chute of claim 4, wherein said rear vertical member of said mounting plate includes slots which cooperate with said tabs for guiding, aligning, and stabilizing said rear flap panel when said collapsible discharge deflecting chute is in the down position.

7. The collapsible discharge deflecting chute as recited in claim 1, wherein said discharge deflecting chute comprises plastic or metal.

8. The collapsible discharge deflecting chute as recited in claim 1, wherein said panels are hingeably connected together by plastic seams forming living hinges.

9. The collapsible discharge deflecting chute as recited in claim 1, wherein said panels are hingeably connected together by integral hinges.

10. The collapsible discharge deflecting chute as recited in claim 1, wherein said hinge means is a single-stamped integral hinge which can be formed by being hit "one time" with a die set instead of being roll formed.

11. The collapsible discharge deflecting chute of claim 1, including a biasing means engaging said inside surface of said front vertical panel and the inside surface of said mower housing to bias said front vertical panel away from said mower housing in an open position.

12. The collapsible discharge deflecting chute of claim 11, wherein said biasing means is a torsion spring having at least one leg engaging said inside surface of said front vertical panel and at least one leg engaging the inside surface of the mower housing, said spring having at lest one coil and being held in position by insertion of a hinge pin/rod through said coil of said spring, said hinge pin/rod holding said legs of said spring in position contiguous with said inside surface of said front vertical panel and the inside surface of said mower housing to bias said pivoting discharge deflecting chute in an open position.

13. The collapsible discharge deflecting chute of claim 1, including a deflector flap attached to the exterior of the mower housing behind said collapsible discharge deflecting chute to keep blades of grass from coming back onto the operator when the collapsible discharge defecting chute 10 is in the closed "up" position.

14. The collapsible discharge deflecting chute of claim 1, wherein said rear flap panel has four edges.

15. the collapsible discharge deflecting chute of claim 1, wherein said rear flap panel has five edges.

16. The collapsible discharge defecting chute of claim 1, wherein said outer top panel has four edges.

17. The collapsible discharge deflecting chute of claim 1, wherein said outer top panel five edges.

18. A self biasing collapsible discharge deflecting chute for rotary mowers hingeably and collapsibly attached to the mower housing comprising:
   a front vertical panel;
   a front hinge plate hingeably connected to said front vertical panel for removably securing said front vertical panel to said mower housing;
   an outer top panel hingeably connected to said front vertical panel;
   an inner top panel hingeably connected to said outer top panel;
   a top hinge plate hingeably connected to said inner top panel for removably securing said front vertical panel to said mower housing; and
   a rear flap panel hingeably connected to said inner top panel so that said collapsible discharge deflecting chute is biased in an open position by gravitational forces or "molded" memory during normal operating conditions permitting the discharge of grass clippings from the mower housing, said collapsible discharge deflecting chute being collapsible upon striking an object blocking said collapsible discharge deflecting chute whereas upon clearing the object said collapsible discharge deflecting chute automatically springs into the open position upon removal of the object.

19. A plastic or metal pivoting discharge deflecting chute attached to the discharge outlet of a rotary mower housing comprising:
   a front vertical panel having a front edge, top edge, bottom edge, rear edge and inside surface, and an outside surface;
   a top horizontal panel having an inside edge, rear edge, and side edge, wherein said side edge of said top horizontal panel is connected to said top edge of said front vertical panel;
   a biasing means attached to the inside of said front vertical panel and the inside of said mower housing to bias said front vertical panel away from said mower housing, said biasing means comprising a torsion spring having at least one leg engaging said inside surface of said front edge of said front vertical panel and at least one leg engaging the inside surface of said mower housing, said spring having at least one coil and being held in position by insertion of a inner pin/rod through said coil of said spring, said hinge pin/rod holding said legs of said spring in position contiguous with said inside surface of said front vertical panel and the inside surface of said mower housing to bias said pivoting discharge deflecting chute in an open position; and
   a stop means comprising tabs attached to the mower housing engaging the exterior of said mower housing and said outside surface of said front edge of said front vertical panel to limit the extension of said front vertical panel in the open position to less than 180 degrees;
   a removably secured mounting plate attached to the outside front surface of the mower housing and said outer surface of said vertical front vertical panel so that said pivoting discharge deflecting chute can be pivoted forward and away from the mower discharge outlet to facilitate bagging means;
   a deflector flap attached to the exterior of the mower housing behind said pivoting discharge deflecting chute to keep blades of grass from coming back onto the operator when the collapsible discharge deflecting chute 10 is in the closed "up" position; and
   wherein upon striking an object said horizontal top panel slides over the top of said mower housing and said vertical front vertical panel pivots inwardly closing the mower discharge outlet and upon clearing the object said pivoting discharge deflecting chute extends into an open position.

* * * * *